Sept. 16, 1969   C. P. KLAPPROTH, JR., ET AL   3,467,411
THREADED SHEET METAL FITTING
Filed Dec. 19, 1966

INVENTORS
CHRISTIAN P. KLAPPROTH, JR.
MELVIN R. DOXZON
BY Beale and Jones
ATTORNEYS

United States Patent Office 3,467,411
Patented Sept. 16, 1969

3,467,411
THREADED SHEET METAL FITTING
Christian P. Klapproth, Jr., 514 Academy Road 21228, and Melvin R. Doxzon, 228 S. Collins Ave. 21229, both of Baltimore, Md.
Filed Dec. 19, 1966, Ser. No. 602,911
Int. Cl. F16l *15/00*
U.S. Cl. 285—219
6 Claims

ABSTRACT OF THE DISCLOSURE

A collar, or joint, for use in forming the connection between a sheet metal tube and a flat-surfaced duct. The collar includes a flanged portion forming a thread at one end adapted to engage a corresponding aperture in the duct whereby the collar may be screwed into the duct to form a joint.

BACKGROUND OF THE INVENTION

The subject disclosure relates to joints or collar fittings for use in the sheet metal trade and, more particularly, for use in forming a connection between the end of a thin-walled sheet metal tube and a metal duct, plenum chamber or panel having a flat-surfaced portion.

At the present time, the installation of sheet metal work in heating, ventilation or air-conditioning systems is time-consuming and expensive, particularly in the installation of fittings which permit the connection of round flexible hose or round tubing to a rectangular duct. At the present time, various types of collars are employed for making such connections; however, all of these collars must be attached by means of sheet metal screws. The collars generally have a flange of approximately one inch in width prepunched with three or more holes, depending upon the size of the collar, and have a collar length of approximately one and a half to two inches on which to secure the hose or tubing. The installation of such collars requires the steps of placing the collar over a suitable hole in the duct work, marking the spots where the sheet metal screws are to be attached, removing the collar and drilling the marked holes, replacing the collar and installation of the sheet metal screws. Although these are fairly simple operations, the installation of any appreciable number of such collars requires a considerable amount of time and labor. At the present time, the high cost of labor and the intense competition in the sheet metal phase of heating and ventilating contracting has made it imperative to reduce the amount of labor involved in these installations in order to remain in business.

SUMMARY OF THE INVENTION

The present invention overcomes the disadvantages of prior devices by providing a sheet metal fitting which permits faster and thus less expensive means of attaching round hose or tubing to rectangular duct work. This is accomplished by eliminating the need for power tools for drilling the holes for receiving sheet metal screws and by eliminating the labor required to make the required measurements and to drive home the screws. The collar is formed of a single sheet of metal rolled and spot welded to form a multilayered round tube. Prior to rolling, a narrow flange is formed along one of the long edges of the sheet. By rolling the sheet at a slight angle, or by forming the flange on an edge of the metal which is skewed by a few degrees with respect to the opposite edge of the sheet, the flange will form a helical threaded portion as the tube is being rolled. To connect this collar to a duct, wall or panel of sheet metal, a round opening the size of the tube is cut out of the panel to which connection is to be made, as is required for presently known installations. A notch is placed on the circumference of the aperture, and the collar may then be screwed into the opening to complete the installation, thus eliminating virtually all of the steps required by the prior art.

BRIEF DESCRIPTION OF THE DRAWINGS

The various features and objects of the invention will be more fully appreciated when considered in the light of the following specification and drawings in which.

DESCRIPTION OF THE PREFERRED EMBODIMENT

Figure 1:
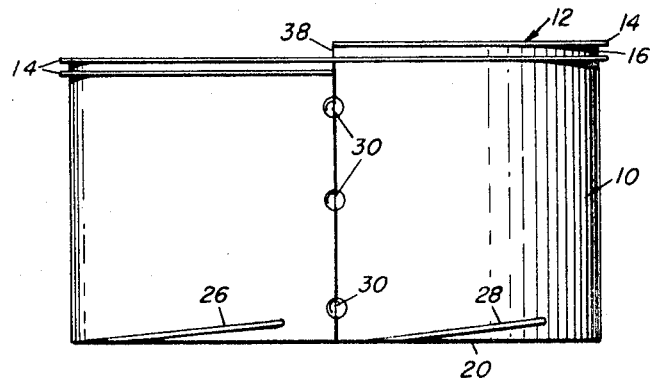
FIG. 1 is a side view of a sheet metal fitting in accordance with the present invention.

Turning now to a detailed description of the invention, FIG. 1 illustrates one form of the fitting wherein the collar includes a cylindrical metal body member 10 having an outstanding, helical flange portion 12 forming an external thread 14 at one end of the body member. The root of thread 14 forms a channel 16 between adjacent thread crests, the width of the channel being dependent upon the pitch of the thread. The fitting is constructed of any suitable metal, for example, galvanized steel, of a thickness ranging, preferably, between 28 and 24 gauge, depending on the diameter of the collar. Practical diameters for the fitting may range between three and twelve inches, although it will be apparent that various other dimensions will fall within the scope of the present invention. The flange may be in the neighborhood of 3/16 of an inch wide and sufficient spacing is provided between the flange portions forming the thread to permit use of the fitting with ductwork having sheet metal ranging from 26 to 18 gauge.

Figure 2:
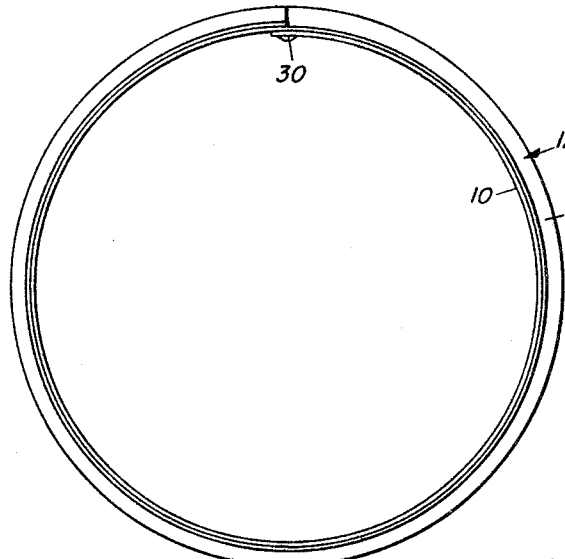
FIG. 2 is a bottom view of the fitting of FIG. 1.
Figure 3:
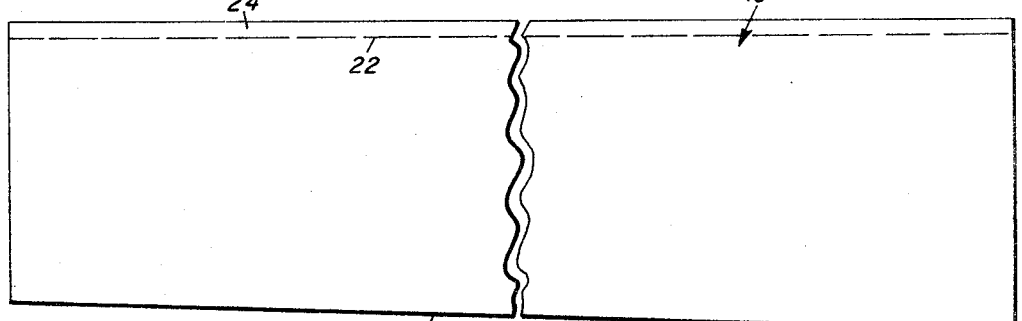
FIG. 3 is an illustration of the general shape of the sheet metal from which the fitting of FIGS. 1 and 2 is rolled.

The collar is constructed from a generally rectangular sheet 18 of galvanized steel, as illustrated in FIG. 3. This sheet is formed with a mitered, or skewed, edge 20, the angle of which establishes the pitch of the threaded portion of the completed collar. A break line 22 indicates the location of the flange portion 24 of the sheet from which the fitting is made. This flange portion 24 is folded outwardly from the axis of the fitting as the galvanized sheet 18 is rolled into its cylindrical form. As illustrated in FIGS. 1 and 2, the body member 10 is preferably formed by two complete rolls, or turns, of the sheet so that the flange will provide an appropriate number of thread forms. If the fitting is rolled in such a manner that the mitered bottom edge 20 remains aligned, the flange portion will automatically produce the desired thread pitch. Alternative methods of making the fitting would be either to form the flange portion along the mitered edge 20 of the sheet 18 and roll the sheet while holding the straight edge in alignment, or to provide a rectangular sheet, form the flange along one edge and roll the sheet at an angle so as to form the desired thread pitch.

If desired, a single helical ridge or a plurality of ridges 26 and 28 may be formed at the unthreaded end of the fitting to provide support for the flexible hose or the tubing which is to be attached to this end of he collar. These ridges may be pressed or rolled on the body portion either during formation of the fitting or at a later time. The flexible hoses presently used in ventilating systems consist primarily of a helical wire over which a suitable covering is applied, and the ridges 26 and 28 provide means for temporarily holding the hose in place while fastening means such as screws, tape or other sealers are applied to affix it permanently to the collar.

After the collar has been rolled to form the body member and the helical thread 14, the collar is spot welded, as at 30, to retain the shape and size of the collar. To perform the spot welding operation, the rolled cylinder is placed in the welding jig with the skewed edge 20 pressed up against a flat surface, thereby aligning several turns of the bottom edge and giving the desired spacing between the flanges, i.e., giving the desired thread pitch. The jig holds the cylinder in shape while the welding operation is performed.

Figure 4:
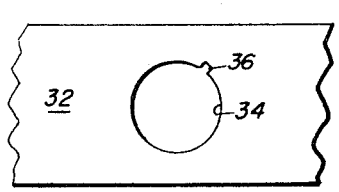
FIG. 4 is a plan view of a panel having an aperture suitable for receiving the fitting of FIG. 1.

FIG. 4 is a diagrammatic illustration of a planar surface 32, which may be the flat portion of a plenum chamber or a rectangular duct, and illustrates an aperture 34 into which the present collar may be threaded to provide the desired connection between a round hose or tube and the rectangular ductwork. The opening 34 has an inner diameter equal to or slightly greater than the outer diameter of the body 10 of the collar. A slot 36 is formed at some arbitrary point around the circumference of opening 34, the slot being sufficiently deep to accommodate the width of flange 12. Attachment of the collar to the ductwork then simply consists of inserting the leading edge 38 of flange portion 12 into slot 36 and rotating the collar portion 360°, thereby drawing the entire periphery of the aperture 34 into channel 16 and thus firmly attaching the fixture to the panel.

Figure 5:
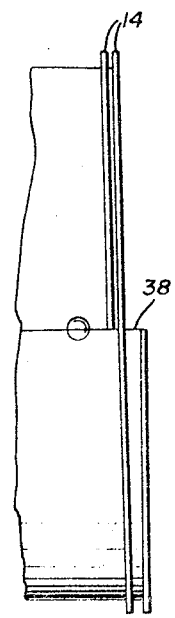
FIG. 5 is a partial side view of a modified sheet metal fitting formed in accordance with the present invention.

By careful matching of the flange spacing, or thread pitch, to the thickness of the metal used in the ductwork 42, a tight seal may be provided at the junction between the ductwork and the collar. If desired, the flanges may be arranged to have a progressively decreasing spacing whereby rotation of the collar will provide a force fit between the collar and the ductwork panel, as shown diagrammatically in FIG. 5. In addition to producing a tight fit, this latter arrangement also permits use of a fitting with various thicknesses of panels. An alternative method for obtaining a tight fit is the use of suitable seals or gaskets.

It will be understood that although the disclosure is directed to a specific embodiment of the invention, it is not intended to be limited thereto, for various modifications of the basic concept will be apparent to those skilled in the art without departing from the spirit of the invention. Thus, for example, the present device is not limited to forming connections in sheet metal ductwork, but is suitable for use in forming tubular connections to any flat-surfaced panel, as long as the distance between the flanges is adapted to the thickness of such a panel. Further, the particular materials used in making this device will depend upon the use to which it is put and the invention is not limited to galvanized sheet metal.

What we claim is:
1. A fitting for forming a connection between a thin-walled tubular member and a panel having an aperture adapted to receive said fitting, said fitting including a multilayered cylindrical body member comprised of two complete turns of a sheet material, each said turn having a helical flange portion located at one end of said body member to form an external thread extending twice around said body member, and the sides and the root of said thread forming a channel adapted to engage both sides of the panel around the periphery of said aperture.

2. The fitting of claim 1, wherein said flange portion is an integral part of and formed along one edge of said sheet material.

3. The fitting of claim 1, wherein the pitch of said thread is sufficiently narrow to engage both sides of said panel around the entire periphery of said aperture, said aperture having a slot adapted to receive the leading edge of said flange portion, whereby said fitting may be screwed into said panel.

4. The fitting of claim 1, wherein the pitch of said external thread decreases gradually from a maximum to a minimum value between the leading edge of said flange portion to the end of said flange portion.

5. The fitting of claim 1, further including ridge means on said body member for holding said thin-walled tubular member on said body member.

6. The fitting of claim 3, wherein the entire periphery of said aperture is received by said channel formed by said external thread when the leading edge of said flange is inserted in said slot and said fitting is rotated 360°.

References Cited
UNITED STATES PATENTS

| | | | |
|---|---|---|---|
| 73,929 | 1/1868 | Recht | 285—424 X |
| 455,502 | 7/1891 | Bayles | 285—424 |
| 1,763,755 | 6/1930 | Bundy | 138—142 |
| 2,392,220 | 1/1946 | Bruhn et al. | 285—405 X |
| 2,907,592 | 10/1959 | Bailey | 285—424 X |
| 3,109,670 | 11/1963 | Engel | 285—424 X |
| 3,152,817 | 10/1964 | Watson et al. | 285—424 X |
| 3,306,638 | 2/1967 | Rubin | 285—390 X |

FOREIGN PATENTS

| | | |
|---|---|---|
| 214,727 | 4/1961 | Austria. |
| 69,154 | 12/1951 | Netherlands. |

THOMAS F. CALLAGHAN, Primary Examiner

U.S. Cl. X.R.
29—476.5, 477; 285—424